United States Patent
Kwong et al.

(10) Patent No.: US 11,935,218 B2
(45) Date of Patent: Mar. 19, 2024

(54) IMAGE TO IMAGE TRANSLATION METHOD

(71) Applicant: City University of Hong Kong, Hong Kong (CN)

(72) Inventors: Tak Wu Sam Kwong, Hong Kong (CN); Jing Liao, Hong Kong (CN); Jialu Huang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 158 days.

(21) Appl. No.: 17/646,884

(22) Filed: Jan. 4, 2022

(65) Prior Publication Data

US 2023/0214973 A1 Jul. 6, 2023

(51) Int. Cl.
*G06T 15/00* (2011.01)
*G06N 3/045* (2023.01)
*G06T 5/50* (2006.01)
*G06T 7/33* (2017.01)

(52) U.S. Cl.
CPC .............. *G06T 5/50* (2013.01); *G06N 3/045* (2023.01); *G06T 7/33* (2017.01); *G06T 2207/20081* (2013.01); *G06T 2207/20084* (2013.01); *G06T 2207/30201* (2013.01)

(58) Field of Classification Search
CPC ........ G06N 3/047; G06N 3/045; G06N 3/088; G06T 5/50; G06T 2207/30201; G06T 2207/20084; G06T 2207/20081
USPC ........................................................ 345/418
See application file for complete search history.

(56) References Cited

U.S. PATENT DOCUMENTS

| | | | |
|---|---|---|---|
| 2023/0214973 A1* | 7/2023 | Kwong | G06N 3/047 345/581 |
| 2023/0245351 A1* | 8/2023 | Cao | G06T 11/00 345/629 |

OTHER PUBLICATIONS

Melnik A, Miasayedzenkau M, Makarovets D, Pirshtuk D, Akbulut E, Holzmann D, Renusch T, Reichert G, Ritter H. Face generation and editing with stylegan: A survey. arXiv preprint arXiv:2212.09102. Dec. 18, 2022.*

Huang J, Liao J, Kwong S. Unsupervised image-to-image translation via pre-trained stylegan2 network. IEEE Transactions on Multimedia. Mar. 17, 2021;24:1435-48.*

Back J. Fine-tuning stylegan2 for cartoon face generation. arXiv preprint arXiv:2106.12445. Jun. 22, 2021.*

(Continued)

*Primary Examiner* — Phu K Nguyen
(74) *Attorney, Agent, or Firm* — S&F/WEHRW

(57) ABSTRACT

A method of providing an image to image translation using a style based generator architecture for generative adversarial networks. The method includes the step of applying a feature alignment loss function defined by:

$$\text{Loss}_{FA} = \Sigma_{i=m}^{n} w_i \cdot L1(\phi(G_{SM})^i, \phi(G_{TM})^i)$$

wherein $G_{SM}$ and $G_{TM}$ are respective generators of a source model and a target model, $\phi(\cdot)^i$ is the extraction of the ith layer of features and $w_i$ represents the weight of L1 loss at the ith layer, the L1 loss weight $w_i$ being reduced as layers decrease such that L1 loss at higher layers has a higher weight than the L1 loss at lower layers.

5 Claims, 4 Drawing Sheets

(56) References Cited

OTHER PUBLICATIONS

Liu et al.; BlendGAN: Implicitly GAN Blending for Arbitrary Stylized Face Generation; Oct. 2021; https://arxiv.org/abs/2110.11728#.

Pinkney et al.; Resolution Dependent GAN Interpolation for Controllable Image Synthesis Between Domains; Nov. 2021; https://arxiv.org/abs/2010.05334.

* cited by examiner

IMAGE TO IMAGE TRANSLATION METHOD

FIELD

The invention relates to image translation and, in particular, to image to image translation.

The invention has been developed primarily to provide an unsupervised transfer learning image to any translation method that artifies human faces and will be described hereinafter with reference to this application. However, it will be appreciated that the invention is not limited to image translation of human faces and is applicable to other objects and scenes.

BACKGROUND

Social media use has become ubiquitous since the mid-2000s and users are becoming heavily interactive by way of images. In the recent decade, social media applications including photo sharing sites and online social networks have been experiencing explosive growth. Many of those applications found that interesting image filters that artifies human faces have attracted lots of potential users.

Most of the filters are developed via Image-to-Image (I2I) translation techniques which can generate images in a target domain (artistic results) by taking an input image in the source domain (human face), where the generated images have high semantic similarities to the input images. Generally, I2I translation methodology can be classified into two taxonomies, one uses cycle loss while the other one is based on transfer learning. The traditional method using cycle loss can cause artifacts and lower quality compared to the transfer learning based method, while the transfer learning based I2I translations cannot ensure semantic similarities between the input and the generated results due to the notorious catastrophic forgetting issues that widely exists in all transfer learning methods.

Around 2014, Goodfellow et al developed a method known as generative adversarial networks (GAN) for training a generative model for use in image translation. Operation of the method employs two models being the generator and a discriminator that is used in training the generator. The discriminator is intended to be trained to predict whether a generated image is 'real' or 'fake' with some certainty. Typically, these models are implemented as deep convolutional neural networks and these are used in implementing GAN training algorithms and loss functions for translating input from a source domain to the target domain. An iterative step model from a training data set is used where a unitary iteration results in one or more updates to the discriminator model and one to the generator model.

It is noted that updating of the discriminator model is not a single step process. Data from the input image is encoded into a latent space which is then reconstructed or decoded to produce the reconstructed image. In updating the discriminator model, a random data selection of the latent space is used as an input to the generator to define a baseline for 'fake' sampled data. Similarly, a selection of data from the data training set is used for input into the discriminator to provide 'real' sampled data. So far as the discriminator provides probabilities or predictions for real and fake sampled data it is iteratively updated depending on previous predictions.

Subsequently, points are generated from the latent space data which are then used in the updated generator model to produce fake images which is then integrated into a training model with 'real' samples from where the discriminator model then makes further predictions for each generated and each real image while updating weightings for those functions. The generator model is updated similarly by using a selection of data from the latent space from which the generator produces 'fake' images which are passed onto the discriminator to classify as real or fake.

It will be appreciated that the discriminator model is trained to classify both real and fake images to some level of probability. Generally, maximisation of the predicted probability of real images and the log of the inverse probability of the fake images is averaged over a batch of examples where the probability of finding a fake image is generally desired to be close to 0 and for real images close to 1. The difference from 1 or 0 in discrimination for a source image is termed a 'loss function' and is inherent in the GAN process. Of course, the discriminator can be trained to maximize the probability of the discriminator being either correct or incorrect.

One known implementation of a GAN is Pix2Pix image translation which provides a general purpose model and a loss function weakness in translation. This is known as conditional generative adversarial network whereby a target image is generated conditional on a given input image whereby the loss function is modified to provide, within defined parameters, a generated image that is reflective of the content in the target domain and an acceptable translation of the input image. In essence, the discriminator model is used to classify images as real from the training data set or fake as having been generated and the generator is trained to deceive or fool the discriminator model. This has been found useful for image to image translation as it is conditional that from an input image a corresponding output images generated as the Pix2Pix GAN is trained on image data sets that consist of both output or target images after translation and pre-translated input images.

Toonify is a GAN implementation that is known to provide particularly good facial image to image translation. However, this process is understood to struggle when there are different target image styles that need to be at least a relatively strongly adapted to facial geometry.

In another I2I translation method known as AgileGAN, a modification is provided where a hierarchical variation encoder maps input images into latent space such that the latent code is sampled from a latent distribution in $Z^+$ (or N) space and used to fine tune the generator to correspond to a defined sample set of image translation styles. The method is trained so that the inverse mapped latent distribution conforms to the original latent Gaussian distribution which reduces known artifacts present on other GANs for translation of real images.

Other well known methods have been proposed to preserve semantic similarities of images between the source and target domains. These methods include direct fine-tuning of the generator and discriminator, layer-swap and FreezeG. Layer-swap tries to swap parts of high-level layers of the source model to the target model after direct fine-tuning, which can enforce the generation using features preserved in the source model. The process combines weighted resolution-level convolutional layers of input models and is detailed in Resolution Dependent GAN Interpolation for Controllable Image Synthesis Between Domains, Pinkney & Adler, 4th Workshop on Machine Learning for Creativity and Design, NeurIPS 2020. However, the layer-swap technique may fail or generate artifacts when the source and target domains are of large distances.

The FreezeG method, https://github.com/bryandlee/FreezeG, freezes several high-level features of the source model and then fine-tunes these on the target dataset. FreezeG is a fixed method that some features in the frozen layer may not be compatible with new features in the target domain, which is referred to as native transfer in transfer learning.

The object of the invention is a desire to provide improved image quality and fidelity of I2I translated images between human and artistic style faces, or to provide a useful alternative.

SUMMARY OF INVENTION

According to an aspect of the invention there is provided a method of providing an image to image translation using a style based generator architecture for generative adversarial networks, the method including applying a feature alignment loss function defined by:

$$Loss_{FA} = \Sigma_{i=m}^{n} w_i \cdot L1(\phi(G_{SM})^i, \phi(G_{TM})^i)$$

wherein <n, $G_{SM}$ and $G_{TM}$ are respective generators of a source model and a target model, $\phi(\cdot)^i$ is the extraction of the ith layer of features and $w_i$ represents the weight of L1 loss at the ith layer, the L1 loss weight $w_i$ being reduced as layers decrease such that L1 loss at higher layers has a higher weight than the L1 loss at lower layers.

In preferred embodiments of the invention modified latent code is injected into at least one of a plurality of final layers corresponding to different target image styles to correct semantic dissimilarities.

Preferably, the method includes the steps of extracting latent code of a predetermined reference target image having an image style via an image inversion method, and injecting that extracted latent code to the last one or more layers such that generated images are adapted to inherit the image style of the reference image. More preferably, the images correspond to human faces and the translation is to an artistic style face, most preferably the artistic styles include cartoon faces, anime faces, oil painting portraits, and animal faces.

BRIEF DESCRIPTION OF DRAWINGS

A preferred embodiment of the invention will now be described, by way of example only, with reference to the accompanying drawings in which.

DESCRIPTION OF EMBODIMENTS

Figure 1:
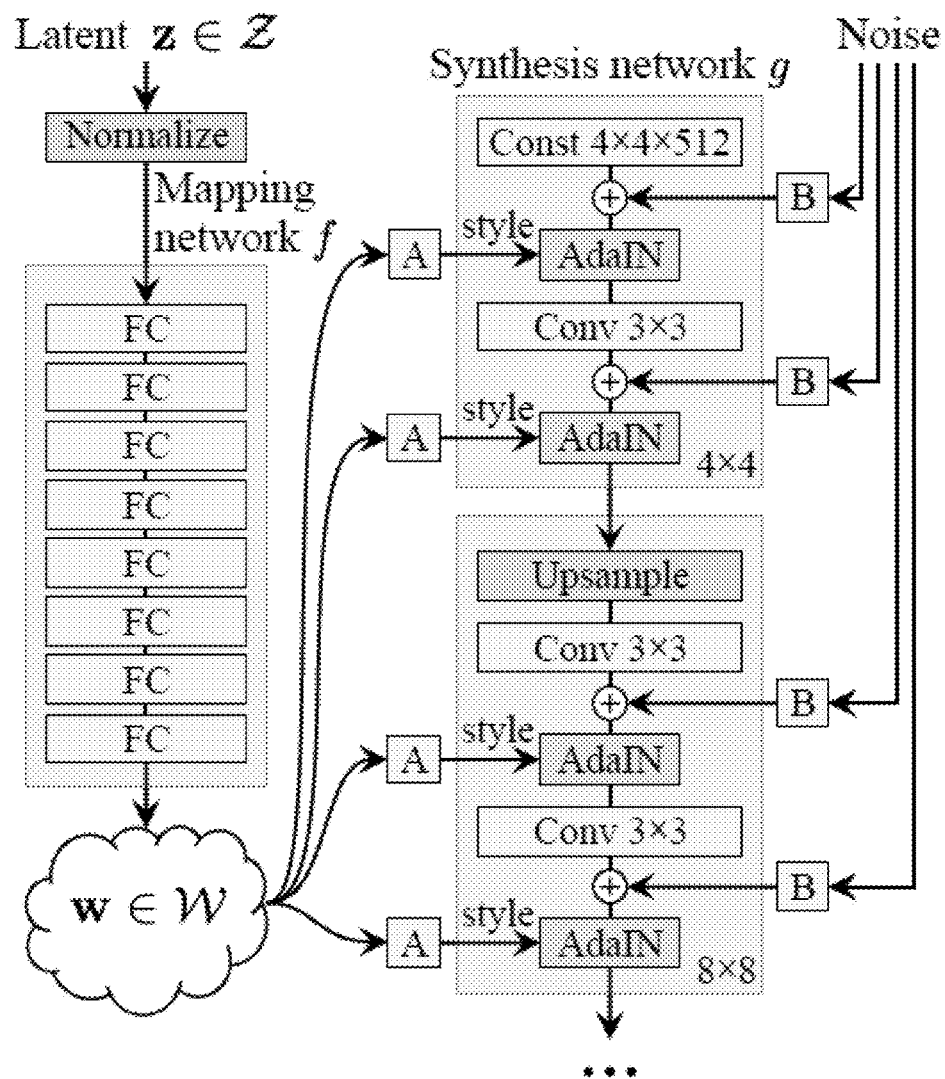
FIG. 1 is a schematic view of a style based generator styleGAN according to the prior art.

The method of the preferred embodiment provides an unsupervised image-to-image translation method based on transfer learning from StyleGAN2 model. Turning firstly to the StyleGAN2, the preferred generator thereof is shown in FIG. 1 as reproduced from "A Style-Based Generator Architecture for GANs", Karras, Laine & Aila, arXiv: 1812.04948v3, https://github.com/NVlabs/stylegan (retrieved 10 Sep. 2021). The contents of Karras et al are expressly incorporated herein by cross-reference.

The method of the preferred embodiment employs a hitherto unknown improvement in the native fine-tuning architecture. This is achieved by adding multi-level feature alignment during training of the generator to maintain semantic similarities of images between the source and target domains. When the preferred embodiment is used with human faces it has been found images generated can achieve a relatively high quality and fidelity. The method in the preferred embodiment is configured to convert a human face to artistic faces such as cartoon face, anime face and oil painting portraits, etc.

It is noted that generally, the I2I translation method of the preferred embodiment is a transfer learning based method configured to generate images with relatively high quality and fidelity to those produce by known methods. The transfer learning based I2I translation method provides that for a given source generation model (SM) trained on source domain, this is fine-tuned in latent space as corresponds to the target dataset to obtain a target model (TM). It will be understood that by employing the same latent code, the source generation and target models can generate images with semantic similarities.

Three aspects are considered of particular importance when evaluating the performance of the I2I translation method according to the preferred embodiment. These are: (1) the generated images are of high quality and fidelity as would be viewed by a user; (2) the generated images shall belong to the target domain, thus, the generated images should "look like" or resemble the type of the target images. For example, if the target domain is cartoon faces, then the generated images should be similar to other cartoon images in the training dataset; (3) the generated images should have as strong a semantic similarity to the source image as possible, namely the generated images should preserve semantic features from the source images. It will be appreciated that it is challenging to keep balance among many competing aspects, for instance, if the generated image is too similar to the source image, it may lose its features that could be identified as an image in the target domain and in this example, not be considered a cartoon face.

Figure 2:
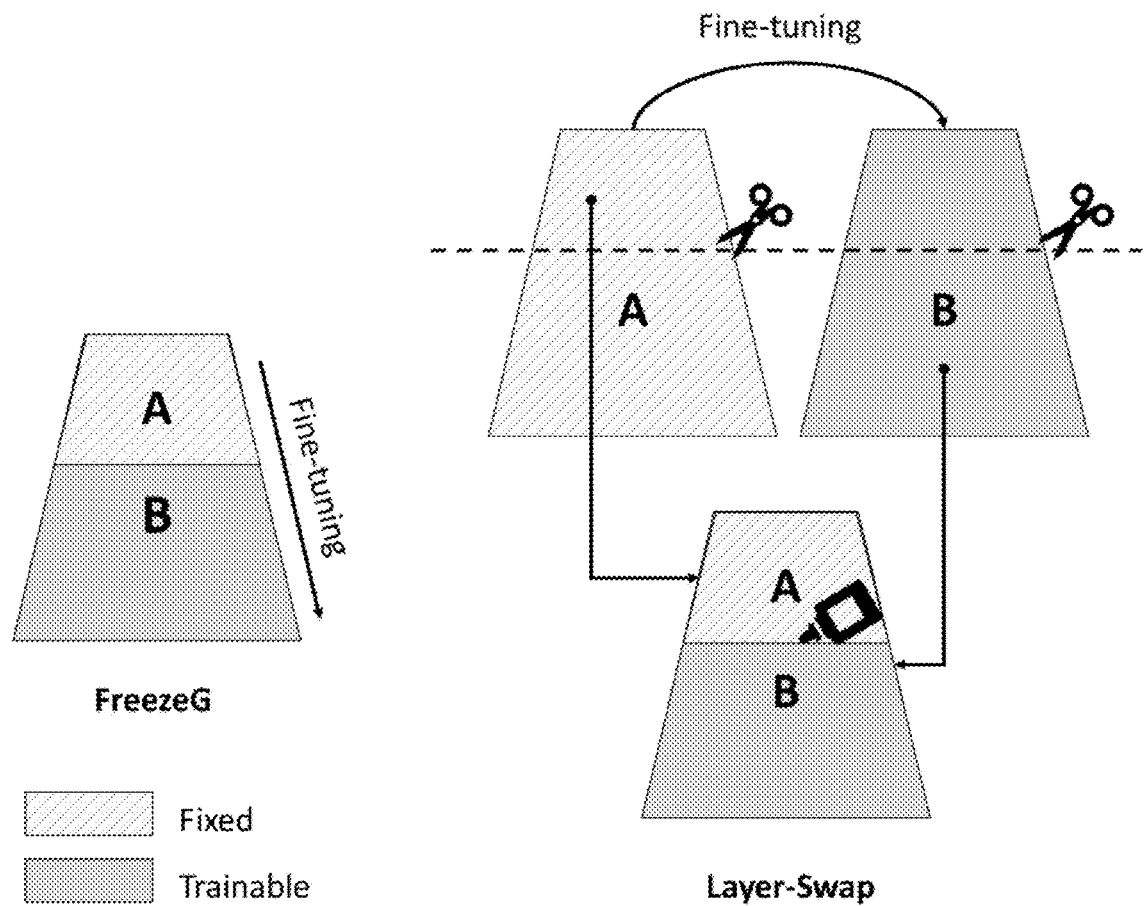
FIG. 2 is a schematic view of the fine tuning of a FreezeG GAN and a layer-swap GAN according to the prior art.
Figure 3:
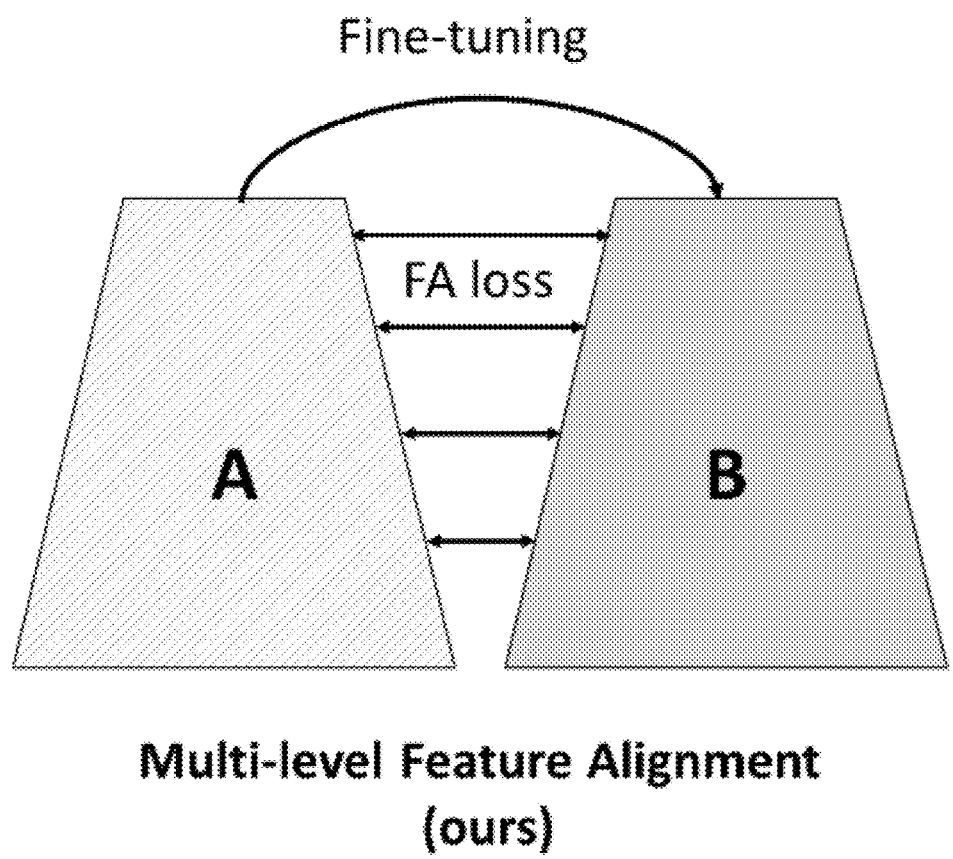
FIG. 3 is a schematic view of the method according to the preferred embodiment.

In the method of the preferred embodiment, a multi-level feature alignment is added at different layers during training. FIG. 2 shows a schematic representation of the generator fine-tuning in the prior art architectures FreezeG and layer-swap respectively. These are contrasted with the preferred method shown in FIG. 3 where for both the source model and the target model, higher layers aim to generate relatively coarse features corresponding to the face outline, shapes and other geometric characteristics while the lower-level layers control the super facial features including textures, colors and other microstructures.

It will be appreciated that generally images in the two domains share more high-level (coarser) features than low-level features. For example, in the translation of an image of a human face to have an oil painting face produced, the major geometric information like the shape of face and location of eyes may remain unaltered, but the colors and texture of facial skins may be changed to oil painting style even with some oil painting brushes traces, in the target image oil painting style example.

More particularly, an L1 normalization loss between the features of the source model and the target model is applied when fine-tuning the target model. The new added feature alignment (FA) loss is defined as:

$$Loss_{FA} = \Sigma_{i=m}^{n} w_i \cdot L1(\phi(G_{SM})^i, \phi(G_{TM})^i)$$

where m<n, $G_{SM}$ and $G_{TM}$ are two generators of the source model and the target model, $\phi(\cdot)^i$ stands for the extraction of the ith layer of features and $w_i$ represents the weight of L1 loss at the ith layer.

In order to achieve the desired relatively high semantic similarities between source and target domains, the weights of L1 loss are reduced correspondingly as the layer number decreases. In this way, L1 loss at higher layers will have larger weight. This can ensure feature alignment at the higher layers and providing for increased flexibility at lower layers, which has been found to advantageously assist the model to generate specific features that belong to the target domain.

In addition, the method of the preferred embodiment essentially retains StyleGAN2 model structure of Karras, and the instant method is preferably configured to inject different latent code at the last one or two layers so as to support generated images to possess different image styles without loss of the significant semantic similarity. Moreover, with a given reference image, the method of the preferred embodiment can extract the latent code via an image inversion method, and inject that specific extracted code to the last few layers, so that the generated images can inherit the style of the reference.

As shown in the application of the method according to the preferred embodiment described below, the method advantageously has been found to perform high-quality high-correlation multi-modal translation between human face and predefined artistic faces. In the method for a given input image, it is first converted to a latent code via image inversion method. The corresponding image based on the latent code in a target domain (cartoon, anime, oil painting, other artistic images, etc.) is then generated. The generated image importantly preserves significant semantic similarities to the input image.

In addition, the generated image in the preferred embodiment is not only semantically similar to the input image but also achieves relatively high quality and fidelity. Moreover, the method of the preferred embodiment can support multi-modal translation, namely allowing for the generated output to have different styles, where the style can also be specified by a reference target image.

It will be appreciated that in comparison to traditional I2I translation methods (Pix2Pix, MUNIT, CycleGAN, etc.) the method of the preferred embodiment has been found capable of achieving relatively higher image quality and fidelity than currently known. With the advantage that the method of the preferred embodiment preserves more semantic similarity even identity between the input and the generated image compared to FreezeG and AgileGAN it additionally supports multi-modal translation so that users can pick different styles for one input image which is not practically supported by known methods such as Toonify (see https://toonify/photos).

Figure 4:
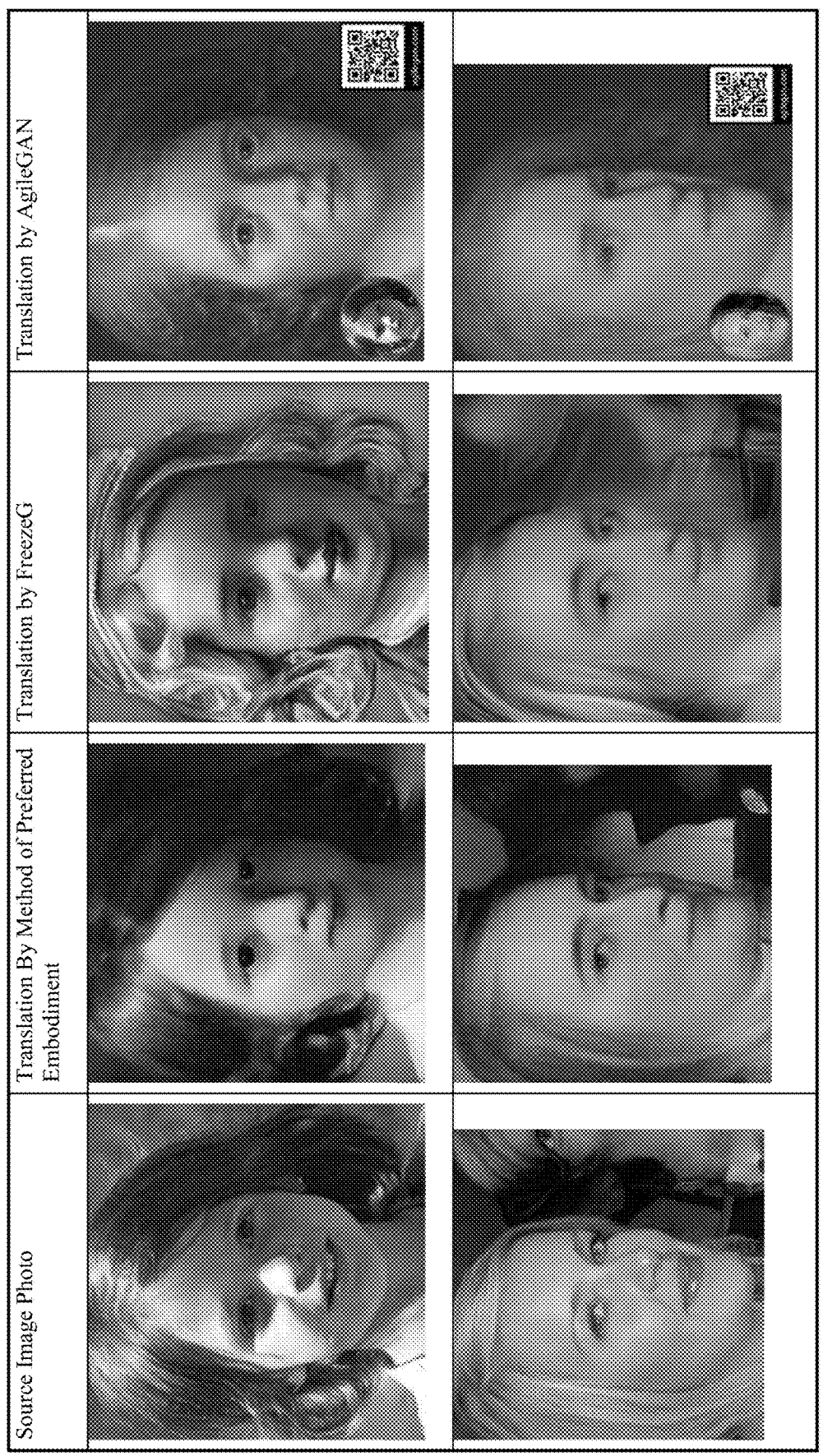
FIG. 4 shows the results of application of the method of FIG. 3 as compared to known image translation methods.

The following details the application of the method according to the preferred embodiment to a photograph of the face of a young girl and a woman where the style domain is an oil-painting. FIG. 4 shows the results of the method, which are presented with a comparison with image translation performed by well known I2I translation methods namely, FreezeG and AgileGAN. These are discussed further below.

The implementation of the image translation was be broken down into three general steps.

Step 1: Preparation 1.1 Data Preparation

A target dataset for image generation was prepared. For example, in the case of image translation from a photograph of a face to the oil-painting domain, and over one thousand oil-portrait painting images were used for this. Specifically, in this preferred embodiment, the public dataset provided by StyleGAN2 was advantageously used. Any other dataset could additionally be adopted as long as it contained enough high-quality data and a predetermined relation to the source domain.

1.2 Model Preparation

In addition to the target domain data, a model pre-trained from the source domain was created. In the above example, a model was trained on human face dataset. Specifically, in the preferred embodiment, the StyleGAN2-ada model trained on FFHQ was used as the pre-trained model.

Step 2: Training

The pre-trained model was pre-loaded and frozen it in memory Ms. And then this model was copied as the tuning model Mt. In the training process, L1 loss between the features of Ms and Mt at feature levels 16×16, 32×32, 64×64 respectively was applied.

Step 3: Inversion and Inference 3.1 A general optimization-based method was used to invert the image to latent code. It will be appreciated that this is a known general method.

3.2 The inverted latent code was then sent in the trained model Mt (in step2) for inference and the feature loss function as above was used on the implementation of the method.

As can be seen in FIG. 4, the visual inspection of the image produced by translation of the method of the preferred embodiment when compared with the images produced by the FreezeG and AgileGAN methods provides positive results. In respect of the image of both the young girl and the woman, the instant translation to oil painting is particularly more life-like. It is seen that the FreezeG generated image of the girl looks significantly more doll-like than life like by virtue of shading and base feature enhancement and her right ear looks damaged.

In respect of the FreezeG generated image of the woman, whilst arguably improved visually as human-like from the girl output, it is blurred and distorted, for example, the right eye is clearly distorted and the left is a different size, the chin is also distorted and the nose is stretched. The partial image of another person in the woman source image has obviously confused the FreezeG method and it can be seen that other than a small distortion of the nose, the preferred embodiment provides improved aesthetics compared thereto.

When comparing the present preferred embodiment with the image translation result of AgileGAN, that output produced a girl image that imbues an oil painting character and but the preferred embodiment produced more aesthetically pleasing images in both young girl and woman. In the AgileGAN, the eyes of the girl are clearly overly misshapen when compared to the source and the present embodiment, and here upper lip has a skewed philtrum that also has a much more pronounced appearance than the source or the translation of the instant method. The image of the woman is superior to the FreezeG image but is especially masculine compared to both the source and the instant method. This can be seen in all areas including the eyes, cheek structure, lips and jaw. The image generated by the instant method is clearly much closer to the source and retains characteristics of the oil-painting domain.

The invention claimed is:

1. A method of providing an image to image translation using a style based generator architecture for generative adversarial networks, the method including applying a feature alignment loss function defined by:

$$Loss_{FA} = \Sigma_{i=m}^{n} w_i \cdot L1(\phi(G_{SM})^i, \phi(G_{TM})^i)$$

wherein;

m<n;

$G_{SM}$ and $G_{TM}$ are respective generators of a source model and a target model, wherein each of the source and target models has a plurality of layers of features the plurality of layers being arranged such that higher-level layers in the plurality of layers generate relatively coarse features including face outline and shapes while lower-level layers in the plurality of layers control super facial features including textures and colors;

$\phi(\cdot)^i$ is an extraction of the ith layer of features in the plurality of layers; and $w_i$ represents a weight of L1 loss at the ith layer, wherein the L1 loss at a higher layer has a higher weight than the L1 loss at a lower layer so as to cause a source image and a target image translated from the source image according to the style based generator architecture to share more high-level features than low-level features.

2. The method according to claim 1 wherein modified latent code is injected into at least one of a plurality of final layers corresponding, to different target image styles to correct semantic dissimilarities.

3. The method according to claim 1 including the steps of extracting latent code of a predetermined reference target image having an image style via an image inversion method, and injecting that extracted latent code to the last one or more layers such that generated images are adapted to inherit the image style of the reference image.

4. The method according to claim 1 wherein the images correspond to human faces and the translation is to an artistic style face.

5. The method according to claim 4 wherein the artistic styles include cartoon faces, anime faces, oil painting portraits, and animal faces.

* * * * *